United States Patent [19]
Tanaka et al.

[11] Patent Number: 4,727,004
[45] Date of Patent: Feb. 23, 1988

[54] THIN FILM ELECTROLUMINESCENT DEVICE

[75] Inventors: Koichi Tanaka, Nara; Takashi Ogura, Tenri; Koji Taniguchi, Nara; Akiyoshi Mikami, Yamatotakada; Masaru Yoshida, Nara, all of Japan

[73] Assignee: Sharp Kabushiki Kaisha, Osaka, Japan

[21] Appl. No.: 932,034

[22] Filed: Nov. 18, 1986

[30] Foreign Application Priority Data

Nov. 21, 1985 [JP] Japan .................................. 60-263274
Mar. 27, 1986 [JP] Japan .................................. 61-70204

[51] Int. Cl.$^4$ ............................................. B32B 16/04
[52] U.S. Cl. ................................... 428/690; 428/691; 313/503
[58] Field of Search ............... 428/690, 691, 917, 698, 428/699; 313/503, 502, 506, 509

[56] References Cited

U.S. PATENT DOCUMENTS 4,264,677  4/1981  Koyama et al. ................ 428/690 X
4,365,184  12/1982  Higton et al. ....................... 313/503
4,547,703  10/1985  Fujita et al. ...................... 428/698 X

OTHER PUBLICATIONS

S. Tanaka et al., "Multi-Color Electroluminescence in Alkaline-Earth-Sulfide Thin-Film Devices," Sid 85 Digest, p. 218, May 1985.

Primary Examiner—Nancy A. B. Swisher
Attorney, Agent, or Firm—Stiefel, Gross & Kurland

[57] ABSTRACT

A thin film EL device having a double-insulated structure and comprising an emitting layer made of an alkaline-earth sulfide as its host material and doped with $Eu^{2+}$ for providing luminescent centers. The emitting layer has a Eu concentration of 0.15 to 0.75 atm. % and a controlled thickness of at least 1.3 μm to impart hysteresis to the brightness vs. applied voltage characteristics of the device.

7 Claims, 4 Drawing Figures

THIN FILM ELECTROLUMINESCENT DEVICE

BACKGROUND OF THE INVENTION

1. Field of the Invention

The present invention relates to a thin film electroluminescent (EL) device which emits in response to the application of an electric field, and more particularly to a thin film EL device which has brightness vs. applied voltage characteristics involving hysteresis, i.e., which has a memory function.

2. Description of the Prior Art

Ever since a thin film EL device was developed for giving a bright EL by applying an a.c. electric field to zinc sulfide (ZnS) doped with luminescent center, various investigations have been made on the structure of such devices. Thin film EL devices comprising an emitting layer of ZnS doped with Mn for luminescent centers, insulating layers sandwiching the emitting layer, and electrodes sandwiching the assembly and including at least one transparent electrode have been made commercially available as light weight, compact and thin EL display panels because of their high brightness and long life characteristics.

Thin film EL devices are also developed which incorporate a controlled amount of the dopant Mn and which are thereby adapted to exhibit a hysteresis phenomenon (memory effect) such that a different brightness can be obtained at the same voltage value when the applied voltage increases and decreases. Since these devices are also adapted for writing and erasing with light and heat, research on practical application is promoted on the use of the display devices as multipurpose input-output terminal systems.

However, the memory effect is available usually only when the thin film EL device uses a ZnS emitting layer doped with Mn luminescent centers, such that the color of luminescence is limited only to yellowish-orange specific to Mn. The device is therefore not fully useful as a display terminal. To explore applications to wider use, continuous research is conducted on thin film EL devices having a memory effect in other luminescence colors. For example, research efforts have been directed to the use of CaS, SrS and like sulfides of alkaline earth metals as host materials for the emitting layer (see S. Tanaka et al., "Multi-Color Electroluminescence in Alkaline-Earth-Sulfide Thin-Film Devices," SID 85 DIGEST, p218, May 1985).

Nevertheless, satisfactory devices still remain to be realized.

SUMMARY OF THE INVENTION

The object of the present invention, which has been accomplished in view of the foregoing problem, is to provide a novel thin film EL device which comprises an emitting layer made of a host material other than ZnS and which is capable of exhibiting memory effect.

The present invention provides a thin film EL device having a double-insulated structure and comprising an emitting layer made of an alkaline-earth sulfide as a host material, doped with 0.15 to 0.75 atm. % of Eu for luminescent centers and having a controlled thickness of at least 1.3 $\mu$m, insulating layers sandwiching the emitting layer, and a pair of electrodes provided on the outer surfaces of the insulating layers, at least one of the electrodes being transparent.

The thin film EL device of the present invention has incorporated therein an alkaline-earth sulfide as the host material of its emitting layer to exhibit an outstanding memory effect. The device produces a red luminescence unlike the yellowish-orange liminescence obtained by the conventional ZnS:Mn emitting layer having a memory effect. Accordingly, the thin film EL device of the invention is of immense technical value in realizing multicolor EL display panels having a memory function. The device is usable for various display devices when in combination with a matrix electrode and segmental electrodes.

DESCRIPTION OF THE PREFERRED EMBODIMENT

Figure 1:
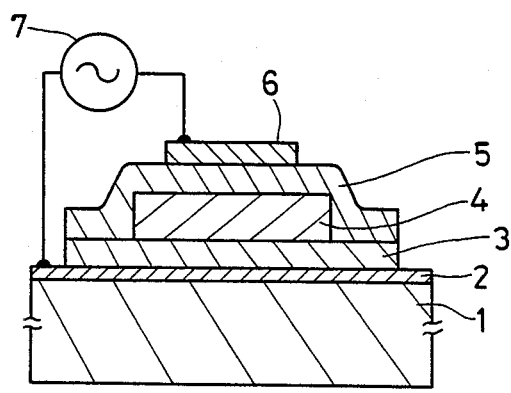
FIG. 1 is a diagram showing the structure of a thin film EL device embodying the present invention.

The thin film EL device having a double-insulated structure and embodying the present invention is prepared usually by forming a first insulating layer over a first electrode provided on a glass substrate, forming an emitting layer on the first insulating layer, forming a second insulating layer over the emitting layer and forming a second electrode on the second insulating layer. To assure moisture resistance, the device may of course be covered with seal glass. An insulating oil such as silicone oil may further be provided between the seal glass and the device.

At least one of the first and second electrodes is transparent. Usually, the first electrode is in the form of a transparent electrode. It is suitable to use an ITO (indium tin oxide) film or SnO$_2$ film as the transparent electrode. This electrode can be formed on a suitable glass substrate by a physical process such as electron beam evaporation, resistive heating evaporation, sputtering or ion plating, or by a chemical process such as spraying or CVD process. It is suitable to control the electrode film thickness of 0.05 to 1.0 $\mu$m. The second electrode (back electrode) may be transparent or nontransparent. An Al film, Ni film, Au film or the like is usable as the nontransparent electrode and can be formed by vacuum evaporation, sputtering or the like.

According to the present invention, it is suitable to prepare the insulating layers from an oxide or nitride such as Al$_2$O$_3$, SiO$_2$, Y$_2$O$_3$, TiO$_2$, HfO$_2$, Ta$_2$O$_5$, Si$_3$N$_4$ and AlN, or a highly dielectric material such as BaTiO$_3$, PbTiO$_3$, SrTiO$_3$, PZT or PLZT. At least two of these materials are also usable in combination. The layer may be in the form of a composite film comprising at least two layers. For example, Si$_3$N$_4$/Al$_2$O$_3$ composite film, Ta$_2$O$_5$/TiO$_2$film, Al$_2$O$_3$/TiO$_2$ film, etc. are useful. From the viewpoint of insulating property, it is suitable that the insulating layers be usually about 0.1 to about 3.0 $\mu$m in thickness. The insulating layers can be formed easily by various processes such as PVD and CVD processes.

The emitting layer which is most characteristic of the present invention has a thickness of at least 1.3 μm and is made of an alkaline-earth sulfide doped with 0.15 to 0.75 atm. % of Eu for luminescent centers.

Examples of useful sulfides of alkaline-earth metals are CaS, SrS, BaS, etc., among which CaS is preferable to use. If the amount of $Eu^{2+}$ is outside the range of 0.15 to 0.75 atm. %, or if the thickness of the emitting layer is less than 1.3 μm, the layer fails to produce a characteristic with a high brightness and with a sufficient memory effect and is unsuited to use. Although there is no upper limit to the thickness in principle, it is usually preferable to control the thickness to not greater than 5 μm in providing the thin film EL device and in view of the limit to the applicable voltage for the use of the device. The amount of Eu is preferably 0.3 to 0.5 atm. %.

It is suitable to prepare the emitting layer by electron beam evaporation using an alkaline-earth sulfide which is doped with a suitable amount (0.01 to 2.0 mol %, preferably at least 0.2 mol %) of europium sulfide (EuS). Also usable are other processes conventionally employed for forming emitting layers, such as sputtering, the CVD process, the ALE (atomic layer epitaxy) process and the MBE (molecular beam epitaxy) process.

The present invention will be described below in greater detail with reference to the drawings and an embodiment.

FIG. 1 is a diagram showing the structure of a thin film EL device embodying the present invention. A glass substrate 1 is provided thereover with a transparent electrode 2 and a first insulating layer 3 on the electrode 2. The electrode 2 and the layer 3 are formed by a thin film forming process. Formed on the first insulating layer 3 is an emitting layer 4 of CaS doped with 0.15 to 0.75 atm. %, preferably 0.3 to 0.5 atm. %, of Eu and having a thickness of at least 1.3 μm. The emitting layer is formed by electron beam evaporation using CaS source pellets mixed with a suitable amount of europium sulfide (EuS) for luminescent centers. A second insulating layer 5 is provided over the emitting layer 4. A back electrode 6 of Al or the like is formed on the layer 4 by a vacuum evaporation method. The transparent electrode 2 and the back electrode 6 are connected to an a.c. power supply 7 for driving the thin film EL device.

Figure 2:
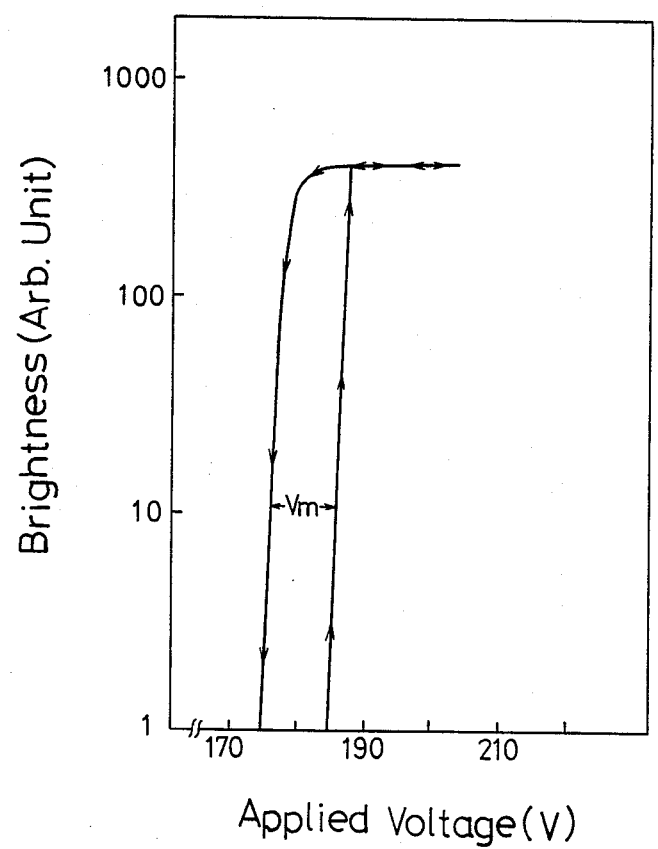
FIG. 2 is a diagram showing the brightness vs. applied voltage characteristics of the device shown in FIG. 1.

FIG. 2 is a diagram showing the brightness vs. applied voltage characteristics (B-V characteristics) of the thin film EL device of FIG. 1 wherein the first and second insulating layers are insulating films (0.2 μm in thickness; $Si_3N_4/SiO_2$ composite film for the first and $Al_2O_3/Si_3N_4$ composite film for the second) formed by reactive sputtering, the transparent electrode is an ITO film (0.15 μm in thickness) formed by reactive sputtering, and the emitting layer is a CaS:Eu film with 0.3 atm. % in Eu concentration and 1.8 μm in film thickness.

The luminescence brightness during increase of the applied voltage differs from that during decrease of the voltage as indicated by different lines, the B-V characteristics thus involving hysteresis (memory effect) as illustrated. The memory width is represented by Vm.

Figure 3:
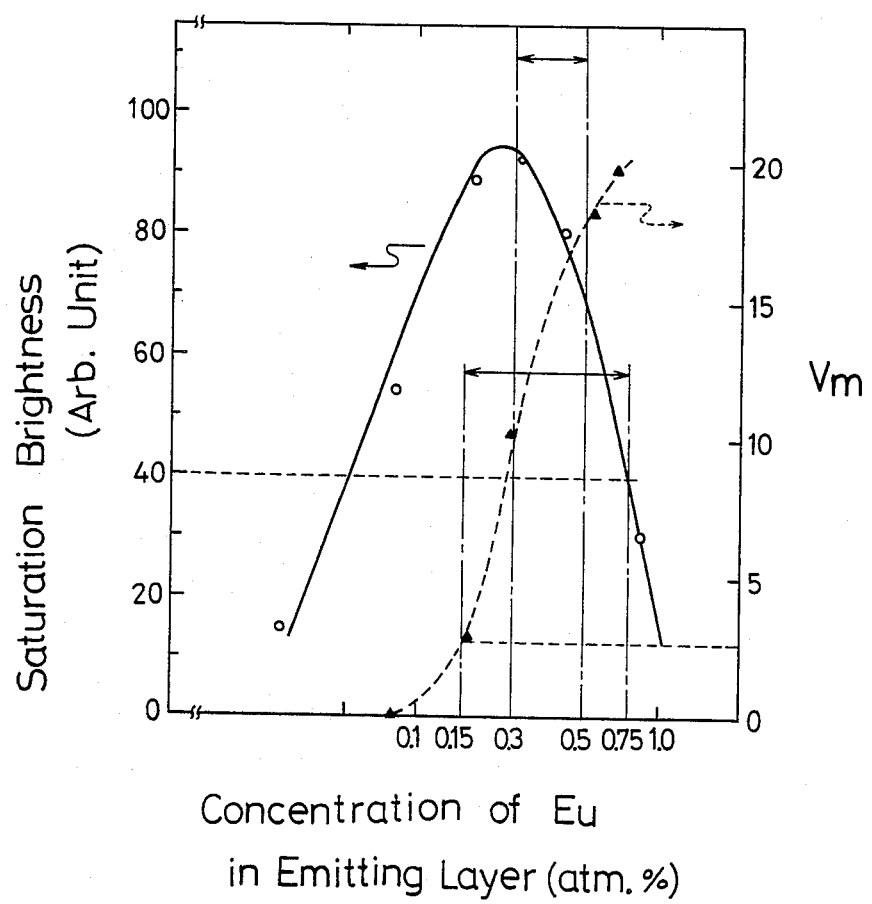
FIG. 3 is a characteristics diagram of the device of FIG. 1 to show the dependence of saturation brightness and memory width Vm on the concentration of Eu dopant.

FIG. 3 is a characteristics diagram showing the dependence of the saturation brightness and the memory width Vm on the Eu concentration, as determined using the device of FIG. 1 when the emitting layer has a definite thickness of 1.8 μm at varying Eu concentrations of the emitting layer. Although the device exhibits no memory effect when the Eu concentration of the emitting layer is low, the effect appears when the Eu concentration is not lower than 0.1 atm. %, and the memory width Vm greatly increases with a further increase in the Eu concentration.

On the other hand, the saturation brightness increases with an increase in Eu concentration in the range of low concentrations, is highest at Eu concentrations of 0.2 to 0.35 atm. %, then markedly decreases with an increase in Eu concentration in the range of higher concentrations. These results indicate that the suitable range of Eu concentration is 0.15 to 0.75 atm. %.

Figure 4:
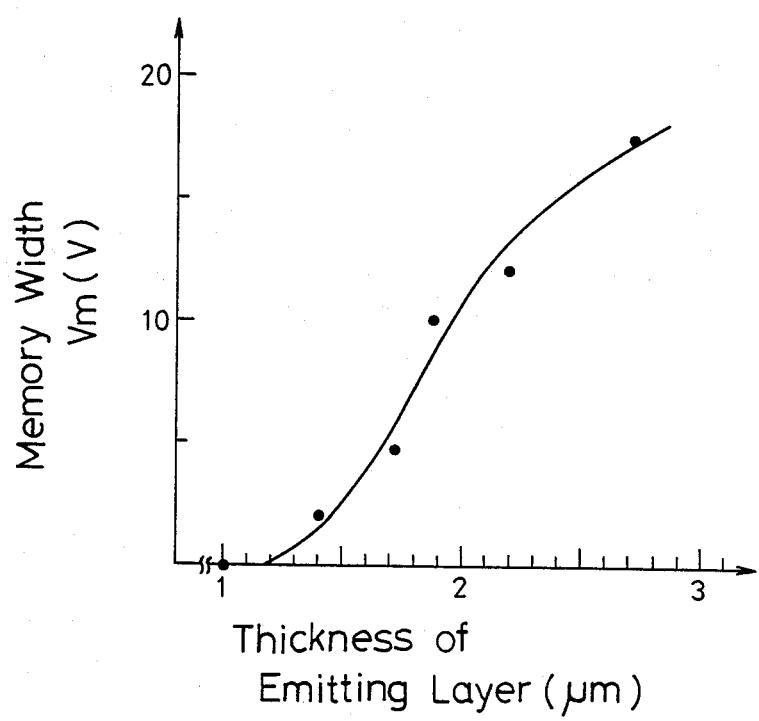
FIG. 4 is a characteristics diagram of the device of FIG. 1 to show the relationship between the thickness of its emitting layer and the memory width Vm.

FIG. 4 is a characteristics diagram showing the relationship between the thickness of the emitting layer and the memory width Vm, as determined for the device of FIG. 1 wherein the emitting layer of CaS is doped with 0.2 to 0.3 atm. % of Eu and formed with use of CaS pellets containing 0.4 mol % of EuS, when the thickness of the emitting layer is varied. Although little or no hysteresis is observed when the thickness is less than 1.3 μm, pronounced hysteresis appears at a thickness of 1.3 μm or greater, and Vm also increases with an increase in the film thickness.

The memory effect is available for the following reason.

Generally, the excitation mechanism of thin film EL devices is such that the electrons within the emitting layer are accelerated by a high electric field in the layer to become hot electrons, which collide with and excite the luminescent centers. Thus, it is thought that excitation is predominantly caused by direct collision. The electrons participating in the excitation are released by the high electric field from the interface states between the emitting layer and the insulating layer or from a level within the emitting layer. After passing through the emitting layer, these electrons are trapped at the interface states between the emitting layer and the insulating layer and then a polarization is formed. The polarization voltage is superposed on the voltage applied from outside upon inversion of the polarity of the applied voltage to produce a bright luminescence. The hysteresis (memory effect) of thin film EL devices is thought to be the phenomenon that when the applied voltage, while increasing, is lowered to a nonluminescence voltage value, the polarization voltage is maintained at the interface level and is therefore superposed on the applied voltage to sustain the luminescence. Thus, the effect is due to the nature of polarization that once provided by the electrons trapped at the interface, the polarization will not readily disappear even when the applied voltage is lowered. Appearance of hysteresis requires two conditions, i.e., a deep interface level and a fewer shallow levels. These levels are associated with variations in the polarization voltage produced by the conduction electrons. When there are many shallow levels, the conduction electrons are easily trapped at the original levels if the velocity of the conduction electrons decreases owing to a diminution of the electric field, with the result that the polarization voltage rapidly decreases and becomes no longer maintained as such to produce no memory effect. In contrast, when a large number of electrons are released from a deep level, the electrons will not be readily re-trapped even if the velocity of the electrons decreases to some extent, consequently affording a sustained polarization voltage despite a decrease in the applied voltage. The sustained polarization voltage leads to hysteresis. Accordingly, even when the applied voltage is lowered to a nonluminescence voltage value, the polarization voltage remains to be superposed on the applied voltage, sustaining a bright luminescence as a memory effect.

The hysteresis (memory effect) heretofore known is available only when an emitting layer of ZnS doped with Mn is sandwiched between insulating layers, presumably because Mn in the host material ZnS is in the form of a bivalent ion which is equivalent to Zn in valence and further because Zn is replaced by Mn without disturbing the crystal lattice of the host material ZnS and without introducing into the host material a shallow level due to lattice distortion or the like, since $Zn^{2+}$ and $Mn^{2+}$ are 0.74 angstrom and 0.80 angstrom, respectively, in ionic radius and are approximate in the radius. Another reason will be that $Mn^{2+}$ forms a deep level within the host material ZnS.

According to the present invention, a sulfide of alkaline earth metal (CaS, SrS or the like) is used as the host material, and Eu is used for providing luminescent centers. Ca, Sr and like alkaline earth metals and Eu are bivalent. In ionic radius, $Ca^{2+}$ is 0.99 angstrom, $Sr^{2+}$ 1.16 angstroms and $Eu^{2+}$ 1.12 angstroms, these elements being approximate in ionic radius. It is therefore thought that the alkaline earth metal can be replaced by $Eu^{2+}$ without disturbing the crystal lattice of the host material. The fact that the thin film EL device with CaS:Eu active layer shows a memory effect indicates that $Eu^{2+}$ provides a deep level within the emitting layer.

Since the memory effect is attributable to the polarization voltage produced by the electrons released from a deep level within the emitting layer as already described, the effect is dependent largely on the concentration of Eu doping the emitting layer. In the range of low Eu concentrations, therefore, the electrons released from the interior of the emitting layer are small in number and fail to effect satisfactory polarization, consequently producing no hysteresis memory effect. However, when a larger number of electrons are released with an increase in the amount of Eu dopant, an increased polarization voltage is superposed on the applied voltage, with the result that conduction electrons reach the other interface without being re-trapped to sustain polarization and produce a hysteresis memory effect. The memory width Vm also increases with the increase of the polarization voltage due to the increase in the Eu concentration. As to the relationship between the saturation brightness and the Eu concentration, on the other hand, the brightness reaches the highest level in the concentration range where the hysteresis memory effect starts to appear, and markedly decreases with an increase in the memory width Vm. Presumably, this is attributable to the following reason. The increase in the memory width, i.e. in the Eu concentration, increases the probability that conduction electrons will collide with the Eu luminescent centers, so that the electrons collide with the Eu luminescent centers one after another before being fully accelerated to become hot electrons, consequently failing to fully excite the luminescent centers and resulting in a reduced brightness. Accordingly, for producing a thin film EL device with a high brightness and with a memory effect, there is a range of optimum Eu concentrations, and it is considered necessary to control the Eu concentration of the emitting layer to the range of 0.15 to 0.75 atm. %.

Next, the reason why the emitting layer should have a thickness of at least 1.3 μm will be discussed. The electric field (threshold electric field) in the luminescent layer of the thin film El devices to emit is about $1.5 \times 10^8$ V/M in the case of ZnS, while in the case of sulfides of alkaline earth metals, for example for CaS, it is as low as about $0.8 \times 10^8$ V/M, so that it is thought that the conduction electrons travel at a lower speed during luminescence and are therefore more readily re-trapped at the original level than is the case of ZnS:Mn. Consequently, when the emitting layer has a small thickness, with the conduction electrons from the interior of the emitting layer producing a low polarization voltage, no memory effect results because the electric field to be superposed is small and because of re-trapping of electrons. On the other hand, it is thought that when the emitting layer has an increased thickness and when an increased number of electrons are released, the resulting increase in the polarization voltage leads to superposition of a sufficient internal electric field, permitting conduction electrons to reach at such a velocity as to pass through the emitting layer to reach the level of the other interface without re-trapping, whereby the polarization is maintained to achieve a memory effect. For this reason, there is a limit to the thickness of the emitting layer in giving the memory effect, and the thickness must be at least 1.3 μm. When the thickness is not smaller than 1.3 μm, Vm increases with increasing polarization voltage.

The thin film EL device of the present invention including an emitting layer of an alkaline earth sulfide doped with Eu produces a red luminescence having a high color purity. Accordingly, it is also possible to realize a thin film EL device having a memory function and adapted for multicolor display by the combination of the emitting layer and a ZnS:Mn emitting layer.

What is claimed is:

1. A thin film EL device which exhibits a memory effect comprising an emitting layer made of an alkaline-sulfide as a host material, doped with 0.15 to 0.75 atm. % of Eu for providing luminescent centers and having a controlled thickness of at least 1.3 μm, insulating layers sandwiching the emitting layer, and a pair of electrodes provided on the outer surfaces of the insulating layers, at least one of the electrodes being transparent.

2. A device as defined in claim 1 wherein the sulfide of alkaline earth metal is CaS, SrS or BaS.

3. A device as defined in claim 1 wherein the amount of Eu is 0.3 to 0.5 atm. %.

4. A device as defined in claim 1 wherein the emitting layer is 1.3 to 5 μm in thickness.

5. A device as defined in claim 1 wherein each of the insulating layers is a film of a oxide or nitride selected from among $Al_2O_3$, $SiO_2$, $Y_2O_3$, $TiO_2$, $HfO_2$, $Ta_2O_5$, $Si_3N_4$ and AlN, a film of a highly dielectric material selected from among $BaTiO_3$, $PbTiO_3$, $SrTiO_3$, PZT and PLZT, or a composite film comprising these films.

6. A device as defined in claim 1 wherein the transparent electrode comprises a film of ITO or $SnO_2$.

7. A device as defined in claim 1, wherein the emitting layer further comprises ZnS:Mn dopant to provide a multi-color display.

* * * * *